United States Patent
Bucks et al.

(10) Patent No.: US 8,174,211 B2
(45) Date of Patent: May 8, 2012

(54) METHOD AND SYSTEM FOR OPERATING A DISCHARGE LAMP SUCH AS TO DETECT DEFECTIVE OPERATION OF THE LAMP

(75) Inventors: Marcel Johannes Maria Bucks, Eindhoven (NL); Engbert Bernard Gerard Nijhof, Eindhoven (NL); Jozef Petrus Emanuel De Krijger, Eindhoven (NL); Jozef Alma Lodewijk Maria Ghijselen, Ghent (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 533 days.

(21) Appl. No.: 12/305,019

(22) PCT Filed: Jun. 7, 2007

(86) PCT No.: PCT/IB2007/052145
§ 371 (c)(1), (2), (4) Date: Dec. 16, 2008

(87) PCT Pub. No.: WO2008/001245
PCT Pub. Date: Jan. 3, 2008

(65) Prior Publication Data
US 2009/0134878 A1 May 28, 2009

(30) Foreign Application Priority Data

Jun. 26, 2006 (EP) .................................... 06116034

(51) Int. Cl.
*G05F 1/00* (2006.01)
*H05B 37/02* (2006.01)
*H05B 39/04* (2006.01)
*H05B 41/36* (2006.01)

(52) U.S. Cl. ........................................ 315/308; 315/349

(58) Field of Classification Search .................. 315/207, 315/208, 209 M, 224, 225, 246–247, 283, 315/291, 307, 308, 360, DIG. 5; 323/236, 323/245

See application file for complete search history.

(56) References Cited

U.S. PATENT DOCUMENTS

| | | | |
|---|---|---|---|
| 6,184,632 B1* | 2/2001 | Kamata et al. | 315/225 |
| 6,362,573 B1 | 3/2002 | Helbing et al. | |
| 7,382,101 B2* | 6/2008 | Fukuda et al. | 315/308 |
| 7,619,362 B2* | 11/2009 | Olsen et al. | 313/623 |
| 2002/0084784 A1 | 7/2002 | Cook et al. | |
| 2003/0102962 A1 | 6/2003 | Flory, IV | |
| 2004/0178748 A1* | 9/2004 | Hamaguchi et al. | 315/291 |
| 2004/0183463 A1 | 9/2004 | Sun et al. | |

FOREIGN PATENT DOCUMENTS

| | | |
|---|---|---|
| DE | 19819510 A1 | 11/1998 |
| EP | 1076478 A2 | 2/2001 |
| EP | 1771044 A1 | 4/2007 |
| WO | 2005104631 A1 | 11/2005 |

* cited by examiner

Primary Examiner — Shawki S Ismail
Assistant Examiner — Dylan White

(57) ABSTRACT

A method for detecting defective operation of a discharge lamp includes determining the lamp impedance and establishing that the lamp is operating in an incandescent mode if it is found that the lamp has a positive impedance.

7 Claims, 4 Drawing Sheets

METHOD AND SYSTEM FOR OPERATING A DISCHARGE LAMP SUCH AS TO DETECT DEFECTIVE OPERATION OF THE LAMP

The present invention relates in general to High Intensity Discharge (HID) lamps, and more particularly to devices for operating such lamps.

Since HID lamps are commonly known, an elaborate description of such lamps is not necessary here. For understanding the present invention, it suffices to say that a HID lamp 7 (see FIG. 1) comprises a burner 3 arranged in an outer bulb 1. The space within the outer bulb 1 can be filled with a gas or can be vacuum; in the following, this space will for sake of convenience be indicated as vacuum chamber 2. The space within the burner 3 will be indicated as burner chamber 4, and is filled with suitable chemical substances required to ignite and maintain a gas discharge. The burner 3 is provided with lamp electrodes (not shown). Wires 5, 6, having the function of carrying the burner 3 and leading current to and from the lamp electrodes, extend through the vacuum chamber 2 and connect to a lamp foot (not shown). Specifically, the wires 5, 6 enter the vacuum chamber 2 at a short distance from each other, extending substantially parallel.

For operation, a voltage is applied over the lamp electrodes, so that a discharge arc is developed between the electrodes. The electric power is provided by an electronic ballast system or electronic driver, which is designed for specific lamps having specific operating characteristics.

A problem with HID lamps is that, when they reach their end of life, the lamp characteristics can change drastically with respect to the normal operating characteristics. Operating modes having such abnormal characteristics are indicated as "End Of Life modes" or EOL modes.

A specific type of EOL mode may occur especially in small, low power MH lamps. This fault situation is initiated by a leakage in the burner 3, which allows part of the burner filling to enter the vacuum chamber 2. Now, the outer bulb 1 may behave as "burner": on ignition by the electronic driver, a discharge occurs between the wires 5, 6 within the chamber 2, i.e. outside the burner 3. This discharge can cause metal particles to be sputtered away from the wires 5, 6, and these particles can be deposited on the inner surface of the outer bulb 1, in the vicinity of the wires 5, 6. If this happens, a metal film results after some time on the inner surface of the outer bulb 1, which metal film may be conductive so that it conducts current. In such case, the electronic driver will operate in the same way as if the current were "normal lamp current". Since the metal film is resistive, Ohmic power loss will occur, the temperature of the metal film rises and the film will glow; therefore, this faulty mode is also indicated as "incandescent mode".

A particular problem of this incandescent mode is that it is difficult to detect, because the power supplied to the lamp by the electronic driver in this mode can be within the power range specified for the lamp 7.

Therefore, it is an objective of the present invention to provide a method and device for reliably detecting that a discharge lamp is operating in incandescent mode. Once it is detected that the discharge lamp is operating in incandescent mode, the lamp can be switched off, a warning signal for the user can be generated, or both.

According to an important aspect of the present invention, the impedance characteristic of a discharge lamp is determined, and it is concluded that the lamp is operating in incandescent mode if it is found that the lamp has a positive impedance characteristic. Determining the lamp impedance can be done by varying the lamp current and analyzing the lamp voltage variation in response to the lamp current variation. The present invention is based on the insight that a discharge lamp operating in incandescent mode has a positive impedance characteristic, whereas a normally operating discharge lamp has a negative impedance characteristic.

It is noted that an electronic driver device with means for detecting faulty lamp operation is known per se. For instance, US-2004/0.183.463 discloses an electronic driver device that measures the lamp voltage and compares the lamp voltage with predetermined reference voltages. If the lamp voltage is within a certain voltage range deviating from normal operating voltage range, it is established that the lamp is leaking. However, this known device is not capable of detecting whether or not the discharge lamp is operating in incandescent mode, because in such case the lamp voltage would still be within the normal operating voltage range.

Determining the impedance characteristic of a discharge lamp can be performed in several ways. It is possible to gradually increase (or decrease) the lamp current during (a part of) a current period: if in response the lamp voltage increases (or decreases), the lamp has a positive impedance characteristic. It is also possible during a current period to stepwise increase (or decrease) the lamp current. It is also possible that the lamp is operated with a first current magnitude during a first current period and with a second, higher (or lower) current magnitude during a second current period.

These and other aspects, features and advantages of the present invention will be further explained by the following description with reference to the drawings, in which same reference numerals indicate same or similar parts, and in which:

FIG. 1 schematically illustrates a HID lamp;

Figure 1:
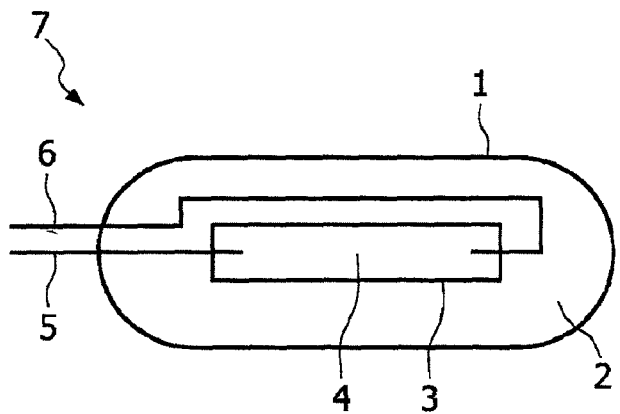
Figure 2:
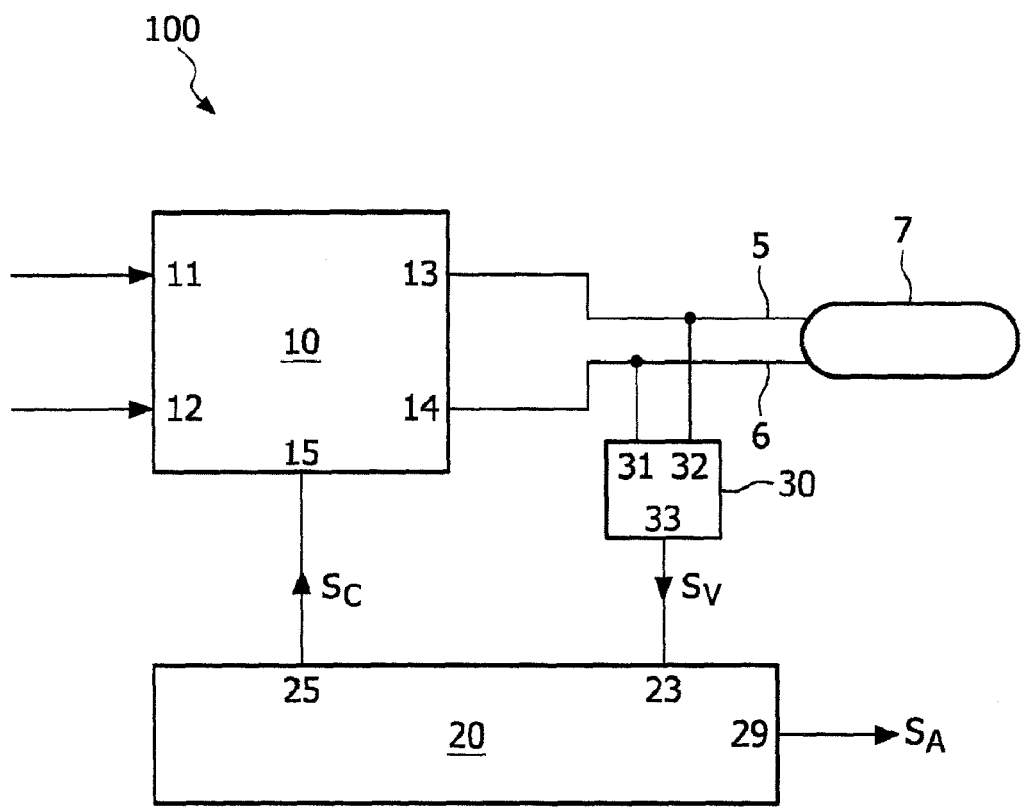
FIG. 2 is a block diagram schematically showing a driver device according to the present invention.

FIG. 2 schematically shows a block diagram of a driver device 100 designed in accordance with the present invention for driving a HID lamp 7. The driver device 100 comprises an electronic driver 10, having input terminals 11, 12 for connection to a supply, for instance mains, and having output terminals 13, 14 for connection to the lamp wires 5, 6. The system will typically be equipped with a lamp fitting matching the lamp foot, but this is not shown in the figure.

Electronic drivers are known per se, so an elaborate description of the design and operation of the electronic driver 10 may be omitted here. By way of example, the electronic driver 10 may comprise means for rectifying mains voltage, means behaving as a voltage source for up-transforming the rectified mains voltage to an intermediate substantially DC voltage in the order of about 400 V, means behaving as a current source for down-transforming the intermediate voltage and generating a constant current, and commutating means for commutating said constant current at a commutation frequency in the order of about 100 Hz, so that the output current supplied to the lamp 7 has a constant magnitude but regularly changes direction. Further, the electronic driver 10 may comprise igniter means for igniting the lamp.

The electronic driver 10 is a controllable driver, having a control input 15 for receiving a control signal Sc. The driver device 100 further comprises a controller 20, having a control output 25 coupled to the control input 15 of the electronic driver 10, the controller 20 being designed to generate a control signal Sc at its control output 25. In response to receiving the control signal Sc, the electronic driver 10 is adapted to set the magnitude of its output current in accordance with the command conveyed by the control signal Sc.

The driver device 100 further comprises a voltage sensor 30 for sensing the lamp voltage, i.e. the voltage between the wires 5, 6. In the embodiment illustrated in FIG. 2, the voltage sensor 30 has two inputs 31, 32 connected to the driver output terminals 13, 14, respectively, and has a signal output 33 coupled to an input 23 of the controller 20: in this embodiment, the controller 20 receives a voltage signal Sv from the voltage sensor 30.

It is noted that the voltage sensor 30 may be integrated with the controller 20. It is also possible that the voltage sensor 30 is integrated with the driver 10.

Further, it is possible that the controller 20 and the driver 10 are integrated.

According to the invention, the controller 20 is designed to determine the impedance characteristic of the lamp 7, and, if the lamp impedance characteristic is found to be positive, to take appropriate steps. Preferably, in such case, the controller 20 switches off the driver 10. It is also possible that the controller 20 has an alarm output 29 for generating an alarm signal Sa if the lamp impedance characteristic is found to be positive, as also illustrated in FIG. 2. Such alarm signal may be a visual signal, a sound signal, or the like. It is also possible that the alarm signal is issued in combination with switching off the driver 10.

For determining the impedance characteristic of the lamp 7, the controller 20 is designed to vary the lamp current and to analyze the resulting lamp voltage variation: if a higher lamp current corresponds to a higher lamp voltage, the impedance characteristic of the lamp is positive. In this respect, it is noted that the impedance characteristic of the lamp is defined as voltage variation over current variation ($\delta V/\delta I$).

Varying the lamp current can be done in several ways. FIGS. 3A-3F are graphs schematically illustrating wave forms of the lamp current produced by the controller 20 by suitably generated control signals Sc; those graphs also show the corresponding lamp voltage.

Figure 3A:
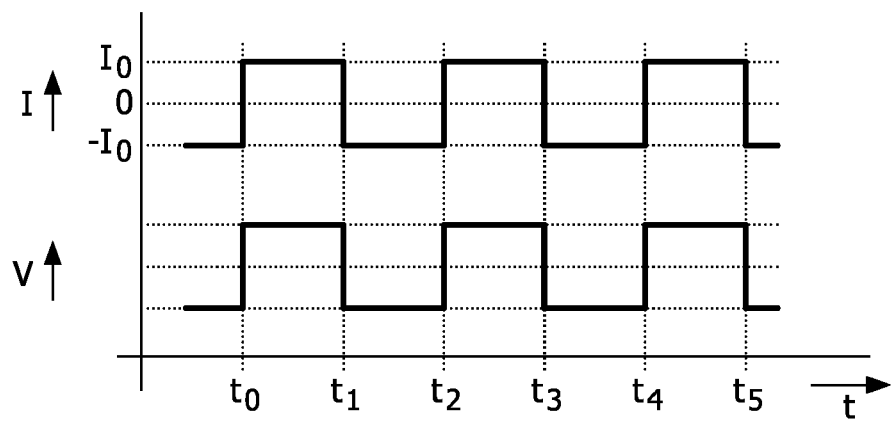
FIGS. 3A-3G are graphs schematically showing waveforms of lamp current and lamp voltage.

FIG. 3A illustrates a normal commutating current with duty cycle 50%. From time $t_0$ to time $t_1$, the lamp current has a substantially constant magnitude $I_0$ and is flowing in a first direction, while from time $t_1$ to time $t_2$ the lamp current has the same magnitude $I_0$ but is flowing in opposite direction, which is shown as a current $-I_0$. The interval from $t_0$ to $t_2$ will be indicated as current period. Typically, the commutation frequency is in the range of 100 Hz to 400 Hz, so the current period is typically in the range of 2.5 ms to 10 ms. The interval from $t_0$ to $t_1$ will be indicated as wave form period; this interval, which corresponds to half a current period, is typically in the range of 1.25 ms to ms. FIG. 3A also shows that during each wave form period the lamp voltage is substantially constant. FIG. 3A also shows that in subsequent current periods the current magnitude is substantially equal to the current magnitude $I_0$.

Figure 3B:
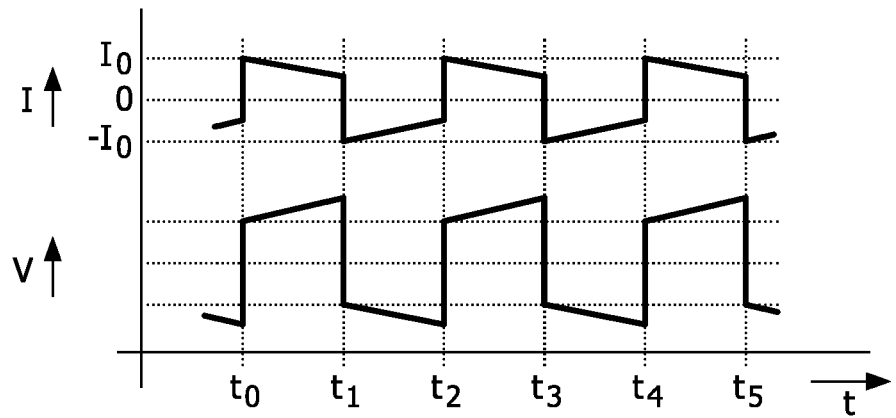

FIG. 3B illustrates an example where the current magnitude gradually decreases during a waveform period. Thus, at time $t_0$, current magnitude I(0) is higher than current magnitude I(1) at time $t_1$. In a normally operating lamp, the lamp impedance characteristic is negative, so the lamp voltage would gradually increase over the wave form period, wherein the lamp voltage at time to would be lower than at time $t_1$, as also illustrated in FIG. 3B.

Figure 3C:
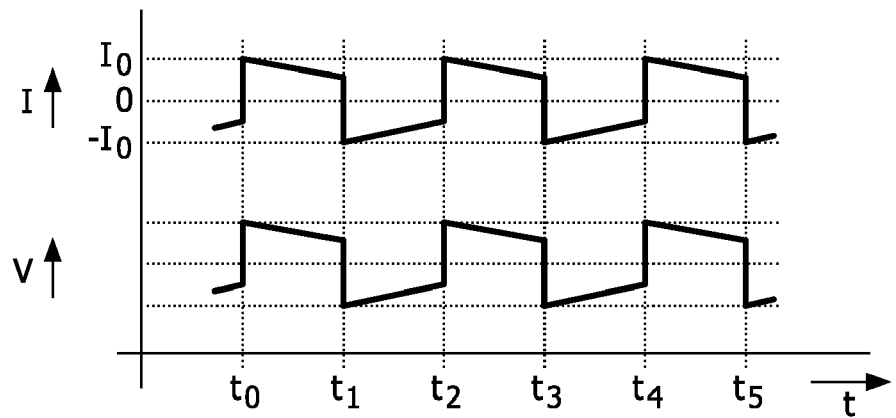

FIG. 3C illustrates an example where the current magnitude gradually decreases during a waveform period, like FIG. 3B, but now for a faulty lamp operating in incandescent mode. Instead of gradually increasing, the lamp voltage is gradually decreasing over the waveform period, thus the lamp impedance characteristic is positive.

It is noted that the amount of current decrease is not critical, but should not be chosen too high or too low. For sake of measurement clarity and non-ambiguity, it is better that the amount of decrease is not too low. Further, in view of the fact that the current variations correspond to light output variations, the current magnitude should preferably start above a predetermined average value and end below this predetermined average value, such that, on average over the wave form period, the current maintains the predetermined average value.

It is noted that instead of decreasing current, it is also possible to use increasing current.

Figure 3D:
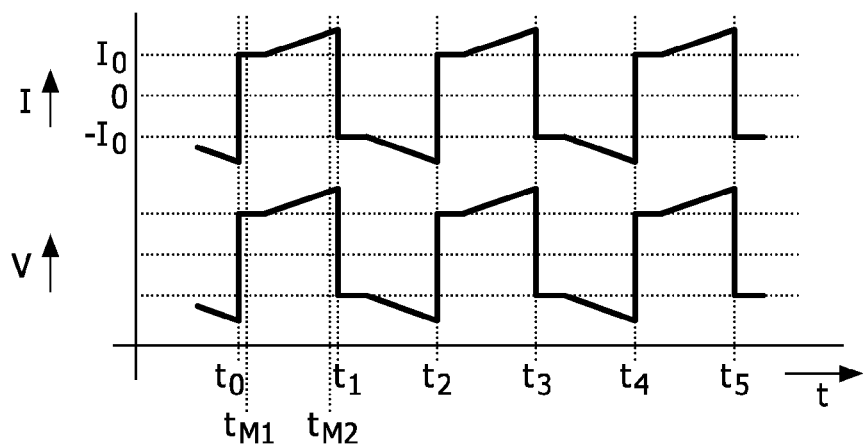

FIG. 3D illustrates that it is not necessary that the lamp current increases/decreases over the entire wave form period. In the example illustrated, the current starts to increase at about 30% of the waveform period, and continues to increase for the remainder of the waveform period.

Figure 3E:
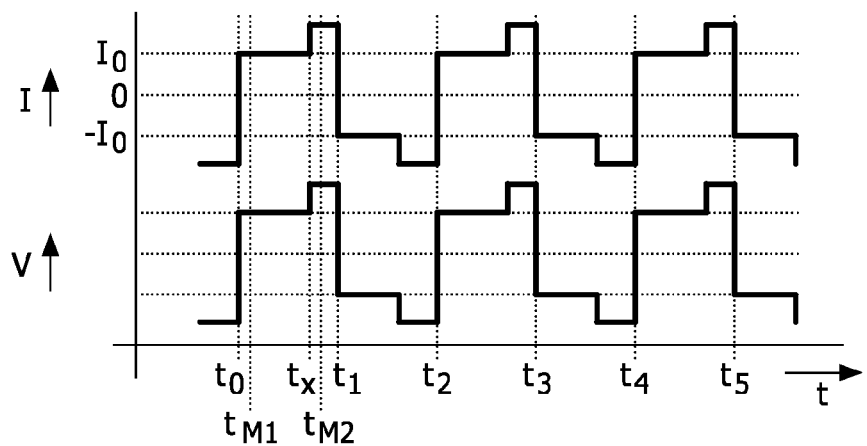

FIG. 3E illustrates that it is not necessary that the lamp current increases/decreases gradually, but a step-wise change from a first current magnitude to a second different (higher/lower) magnitude is also possible.

In fact, all what is needed is that the controller 20 defines at least two measuring moments in time (indicated as $t_{M1}$ and $t_{M2}$ in the figures) where the lamp currents $I(t_{M1})$ and $I(t_{M2})$ are mutually different. The controller 20, who controls the lamp current, knows which of those lamp currents $I(t_{M1})$ and $I(t_{M2})$ is higher. By measuring the lamp voltage $V(t_{M1})$ and $V(t_{M2})$ at said two measuring moments and checking which of those lamp voltages is higher, the controller 20 can determine whether the lamp impedance characteristic is positive or negative.

With respect to the two measuring moments $t_{M1}$ and $t_{M2}$, the following is noted. In many, if not all, discharge lamps the lamp impedance characteristic depends on time, which comes to expression most clearly in a step response. If the current is changed stepwise, a normal discharge lamp will respond with a positive lamp impedance characteristic during a time interval of a few microseconds; this interval, which will be indicated as the positive impedance interval, may have a typical duration of 1-10 μs. Then, during a time interval which will be indicated as the negative impedance interval, the normal lamp will show its negative impedance characteristic. This negative impedance interval typically extends to the range of milliseconds. At an even larger timescale, in the order of several seconds to even minutes, depending on lamp type, the impedance characteristic may be positive again.

Further, it is noted that the drawings show the stepwise change of the current to be instantaneous, i.e. infinitively steep, but in practice a rise time may be in the order of several microseconds. Further, it is noted that electronic components may suffer from tolerance, so there will be some tolerance needed in timing. Further, the voltage measurement itself, such as by sample-and-hold techniques, may take some time.

Thus, the two measuring moments $t_{M1}$ and $t_{M2}$ should preferably be selected not too soon after a step change, but a certain waiting time $t_{WAIT}$ after a step change should be taken into account. The exact value of this waiting time $t_{WAIT}$ is not critical; it should on the one hand be large enough to avoid the positive impedance interval and to allow stabilization in the negative impedance interval, while on the other hand it should be small enough to have the measurement fit within the same waveform period as the step change. A suitable value for the waiting time $t_{WAIT}$ is in the order of 10-100 μs. FIGS. 3D and 3E show that the first measuring moment $t_{M1}$ does not coincide with the commutation moment $t_0$: $t_{M1} \geq t_0 + t_{WAIT}$. FIG. 3D shows that the second measuring moment $t_{M2}$ does not coincide with the commutation moment $t_1$: although the second measuring moment $t_{M2}$ may be very close to the commutation moment $t_1$, the figure shows that the time difference between the second measuring moment $t_{M2}$ and the commutation moment $t_1$ is selected to be in the same order as $t_{WAIT}$.

FIG. 3E shows that the second measuring moment $t_{M2}$ does not coincide with the commutation moment $t_1$ and also does not coincide with the moment $t_X$ of current step change. Here, the second measuring moment $t_{M2}$ obeys the formula $t_{M2} \geq t_X + t_{WAIT}$. In order to assure that the second measuring moment $t_{M2}$ is within the same wave form period as the step change moment $t_X$, and to assure that there is ample time difference between the second measuring moment $t_{M2}$ and the commutation moment $t_1$, the step change moment $t_X$ preferably obeys the formula $t_X \leq t_1 - 2 \cdot t_{WAIT}$.

Figure 3F:
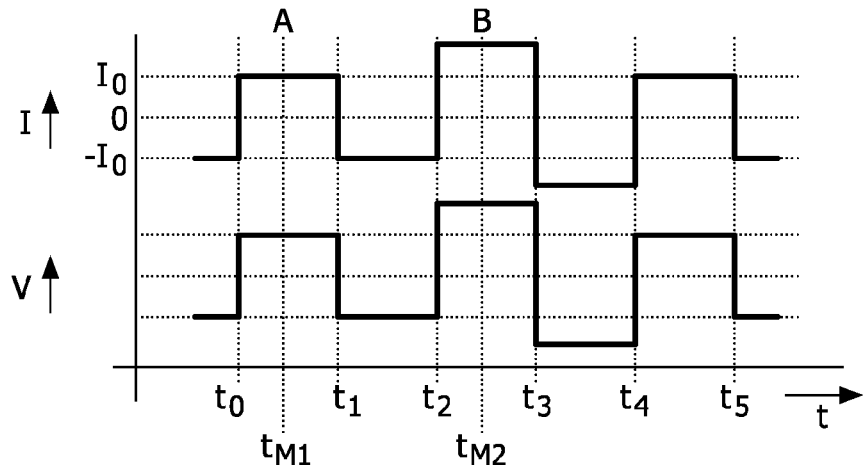
Figure 3G:
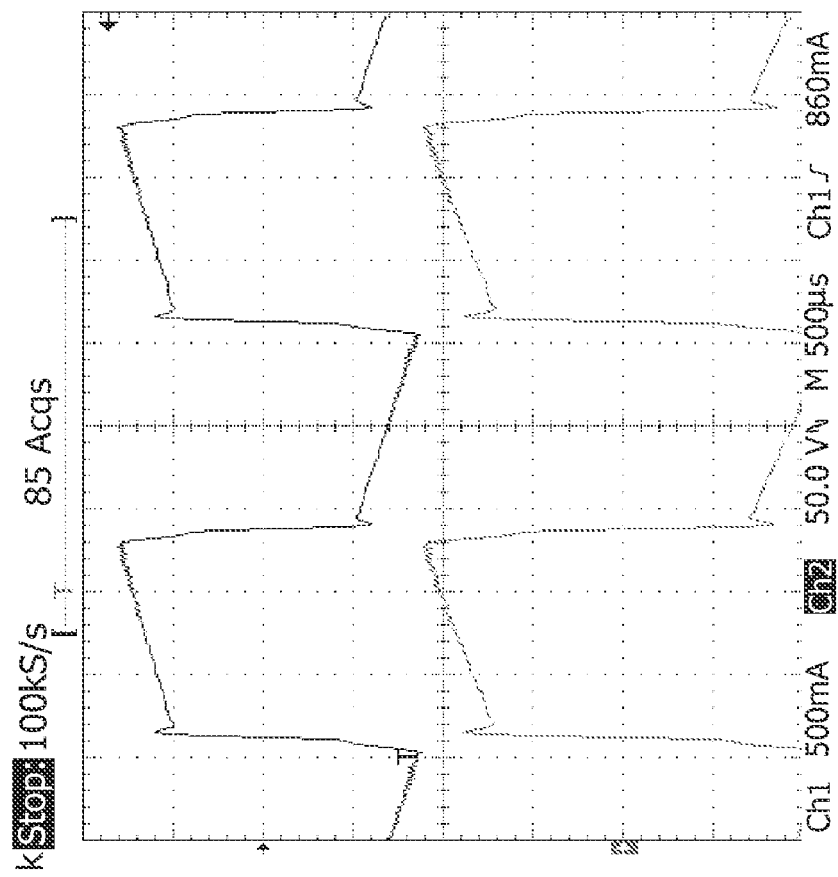
Figure 3G:
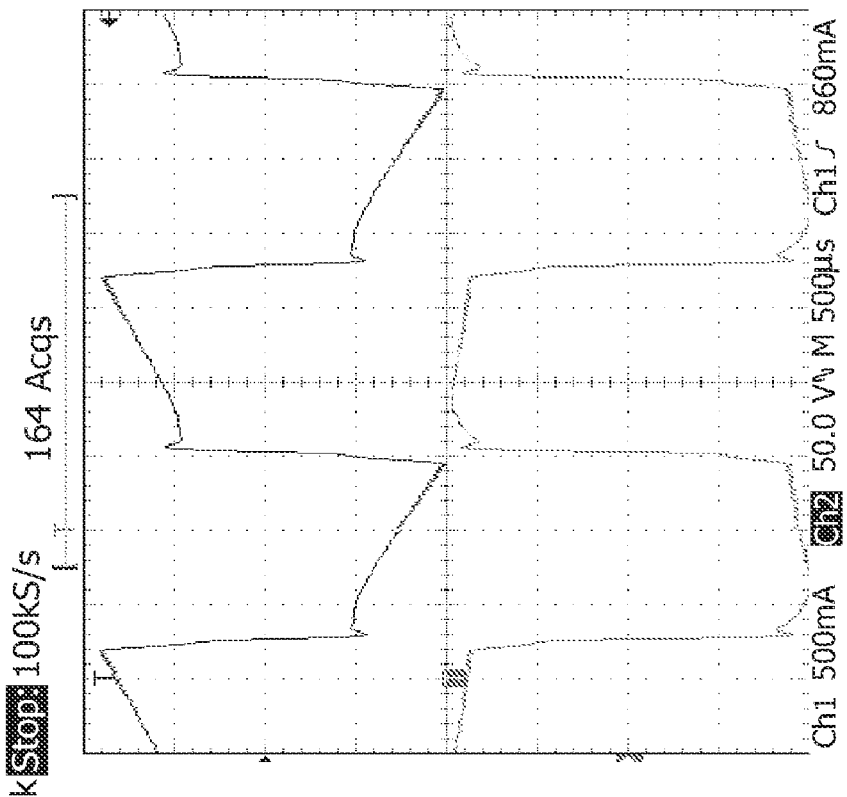

FIG. 3G shows actually measured current and voltage waveforms. The lefthand graph shows current (upper curve) and voltage (lower curve) for a lamp, whereas the righthand graph shows current (upper curve) and voltage (lower curve) for a resistive load. In each case, the current gradually increases by more than 50% over a waveform period. It can be seen in the lefthand graph that the voltage remains substantially constant, or even slightly decreases towards the end of the waveform period.

It should be clear to a person skilled in the art that the present invention is not limited to the exemplary embodiments discussed above, but that several variations and modifications are possible within the protective scope of the invention as defined in the appending claims.

For instance, in the above examples, the said measuring moments $t_{M1}$ and $t_{M2}$ are defined within one and the same waveform period. Although this is preferred, this is not essential, as illustrated by FIG. 3F, where the current magnitude during a first wave form period A is constant and where the current magnitude during a second wave form period B is constant but higher than the current magnitude during the first wave form period A. Thus, the said measuring moments $t_{M1}$ and $t_{M2}$ are defined within said two different waveform periods A and B, respectively. In the example shown, the said measuring moments $t_{M1}$ and $t_{M2}$ are selected approximately midway between the corresponding commutation moments.

Further, it is possible that said two measuring moments $t_{M1}$ and $t_{M2}$ are defined in each wave form period, so that the controller 20 checks the lamp impedance twice in each current period. Although this is preferred, this is not essential. For instance, it is possible that the lamp impedance is checked only once per second. However, in view of the fact that the lamp impedance check involves a current variation, while a current variation is accompanied by a light output variation, the lamp impedance checks are preferably performed at a repetition rate higher than 100 Hz in order to prevent noticeable flicker.

Further, it is possible that the controller 20 is always operative to check the lamp impedance. However, it is also possible that the controller 20 is capable of selectively operating in two operating modes, one normal mode in which the lamp current is maintained constant and one diagnostic mode in which the controller operates as described above. The controller 20 may for instance operate in its diagnostic mode in response to receiving a user command, or in predetermined time intervals (for instance once per hour), or within a predetermined time interval after start-up.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A method for detecting defective operation of a discharge lamp, comprising the acts of:
    determining a lamp impedance characteristic of the discharge lamp; and
    concluding that the discharge lamp is operating in an incandescent mode if it is found that the lamp impedance characteristic is positive,
    wherein a lamp current of the discharge lamp is stepwise increased or decreased at a step change time during a wave form period, and wherein said first measuring moment is chosen before said step change time and said second measuring moment is chosen after said step change time within the same wave form period.

2. The method according to claim 1, wherein the time interval between said step change time and said second measuring moment is at least equal to a predetermined waiting time.

3. The method according to claim 2, wherein the lamp is of a type having an impedance characteristic which in response to a stepwise current change at first is positive during a first time interval on a microseconds timescale and then is negative during a second time interval extending into the milliseconds range, and wherein said predetermined waiting time is substantially longer than said first time interval.

4. A method for detecting defective operation of a discharge lamp, comprising the acts of:
    determining a lamp impedance characteristic of the discharge lamp; and
    concluding that the discharge lamp is operating in an incandescent mode if it is found that the lamp impedance characteristic is positive,
    wherein the lamp is operated with commutating current, and wherein said first measuring moment is chosen after a commutation moment, wherein the time interval between said commutation moment and said first measuring moment is at least equal to a predetermined waiting time.

5. The method of claim 4, wherein the concluding act includes at least one of:
    increasing a lamp current of the discharge lamp, and determining that the lamp impedance characteristic is positive if a lamp voltage of the discharge lamp increases in response to the increasing act; and
    decreasing a lamp current of the discharge lamp, and determining that the lamp impedance characteristic is positive if the lamp voltage decreases in response to the decreasing act.

6. The method of claim 4, wherein the determining act includes the acts of:
    changing a lamp current of the discharge lamp in a first direction; and
    determining that a lamp voltage of the discharge lamp changes in the first direction in response to the changing act.

7. The method of claim 4, wherein the determining act is performed more than once during a period of a lamp current.

* * * * *